(12) United States Patent
Wendt et al.

(10) Patent No.: US 9,802,733 B2
(45) Date of Patent: Oct. 31, 2017

(54) ASSEMBLY FOR AUTOMATICALLY SECURING A MAIL ITEM

(71) Applicant: Deutsche Post AG, Bonn (DE)

(72) Inventors: Peter Wendt, Bennewitz (DE); Mark Veasey, Bonn (DE); Frank Steinert, Lohmar (DE); Mike Renoth, Merseburg (DE); Ingo Kleilein, Bassum (DE)

(73) Assignee: Deutsche Post AG, Bonn (DE)

( * ) Notice: Subject to any disclaimer, the term of this patent is extended or adjusted under 35 U.S.C. 154(b) by 0 days.

(21) Appl. No.: 15/245,460

(22) Filed: Aug. 24, 2016

(65) Prior Publication Data

US 2017/0057693 A1   Mar. 2, 2017

(30) Foreign Application Priority Data

Aug. 24, 2015  (DE) .......................... 10 2015 113 987

(51) Int. Cl.
   *B65D 19/44*   (2006.01)
   *B65D 19/40*   (2006.01)
   (Continued)

(52) U.S. Cl.
   CPC ............ *B65D 19/40* (2013.01); *B60P 7/0838* (2013.01); *B65D 19/44* (2013.01);
   (Continued)

(58) Field of Classification Search
   CPC .... B65D 19/44; B65D 19/00; B65D 71/0088; B65D 71/0096; B65D 71/0092
   (Continued)

(56) References Cited

U.S. PATENT DOCUMENTS

| 2,523,271 A | * | 9/1950 | Bartel ................. | B65D 19/385 |
| | | | | 108/55.1 |
| 3,147,860 A | * | 9/1964 | Kean, Sr. .............. | B65D 19/08 |
| | | | | 108/53.5 |

(Continued)

FOREIGN PATENT DOCUMENTS

| DE | 202008012869 U1 | 2/2009 |
| GB | 734002 | 7/1955 |

(Continued)

OTHER PUBLICATIONS

German Office Action issued by German Patent Office on Jun. 6, 2016 in related application.

(Continued)

*Primary Examiner* — Jose V Chen
(74) *Attorney, Agent, or Firm* — Woodard, Emhardt, Moriarty, McNett & Henry LLP

(57) ABSTRACT

Disclosed is an assembly for automatically securing at least one mail item on a transport tray, the assembly including the mail item and the transport tray, on which the mail item can be placed, and a fixing arrangement designed to secure the mail item on the transport tray, wherein the assembly for lowering and raising the transport tray in a height-adjusting manner is designed in such a way that, by lowering the transport tray into a loading position, the distance between the fixing arrangement and the transport tray is increased in such a way that, in the loading position, the mail item can be placed on the transport tray between said transport tray and the fixing arrangement, and is designed in such a way that, by raising the transport tray from the loading position, the distance between the fixing arrangement and the transport tray is reduced in such a way that the fixing arrangement comes to rest on the mail item in order to secure the mail item against falling off from the transport tray. Due to the proposed assembly, it is ensured that, during transport, for (Continued)

example over a distance of several hundred meters, the mail item cannot fall off from the transport tray and thus be lost.

16 Claims, 4 Drawing Sheets

(51) Int. Cl.
    *B60P 7/08*         (2006.01)
    *B65D 71/00*      (2006.01)

(52) U.S. Cl.
    CPC ..... *B65D 71/0088* (2013.01); *B65D 71/0096* (2013.01); *B65D 2519/0081* (2013.01); *B65D 2519/00786* (2013.01); *B65D 2519/00796* (2013.01); *B65D 2519/00815* (2013.01); *B65D 2571/00055* (2013.01)

(58) Field of Classification Search
    USPC ............ 108/55.1, 54.1, 51.11; 206/386, 448, 206/451; 220/23.91, 23.89
    See application file for complete search history.

(56) References Cited

U.S. PATENT DOCUMENTS

| | | | | |
|---|---|---|---|---|
| 3,438,343 A * | 4/1969 | McConnell | ............ | A47B 47/03 108/53.5 |
| 3,850,295 A * | 11/1974 | Black | ............ | A47F 7/04 108/53.5 |
| 3,938,660 A * | 2/1976 | Moehring | ............ | B65D 19/08 206/448 |
| 4,432,689 A * | 2/1984 | Shell | ............ | B66C 1/18 108/52.1 |
| 4,703,702 A * | 11/1987 | Speicher | ............ | B65D 19/385 108/52.1 |
| 5,154,310 A * | 10/1992 | Massey | ............ | B65D 19/44 108/53.3 |
| 5,439,152 A * | 8/1995 | Campbell | ............ | B60R 9/00 108/55.1 |
| 6,216,607 B1 * | 4/2001 | Cuddy | ............ | B65D 19/0012 108/55.1 |
| 6,602,032 B2 * | 8/2003 | Arai | ............ | B65D 19/385 108/55.1 |
| 7,673,569 B2 * | 3/2010 | Ishikawa | ............ | B65D 19/385 108/55.1 |
| 7,997,213 B1 * | 8/2011 | Gauthier | ............ | B65D 88/022 108/53.1 |
| 8,297,452 B2 * | 10/2012 | Anscomb | ............ | B65D 19/08 211/175 |
| 8,857,634 B2 * | 10/2014 | Harris | ............ | B65D 19/08 108/53.1 |
| 9,340,322 B2 * | 5/2016 | Harris | ............ | B65D 19/385 |
| 2005/0188901 A1 * | 9/2005 | Arai | ............ | B65D 19/12 108/53.1 |
| 2013/0276677 A1 * | 10/2013 | Kokatsu | ............ | B65D 19/0004 108/55.5 |

FOREIGN PATENT DOCUMENTS

| | | |
|---|---|---|
| GB | 1 270 337 | 4/1972 |
| GB | 2 363 599 A | 1/2002 |
| GB | 2 402 380 A | 12/2004 |

OTHER PUBLICATIONS

Machine Translation of DE202008012869U1 by Lexis Nexis Total Patent on Sep. 23, 2016.
Machine Translation of German Office Action issued in related case by Google Translator dated Sep. 22, 2016.
German Office Action issued by German Patent Office dated Sep. 16, 2016 in related application.

* cited by examiner

ASSEMBLY FOR AUTOMATICALLY SECURING A MAIL ITEM

CROSS REFERENCE TO RELATED APPLICATIONS

This application claims priority to German Patent Application No. 10 2015 113 987.1 filed Aug. 24, 2015 which is hereby incorporated by reference.

BACKGROUND

The invention relates to an assembly for automatically securing at least one mail item on a transport tray, comprising the mail item and the transport tray, on which the mail item can be placed, and a fixing arrangement designed to secure the mail item to the transport tray. The invention additionally relates to a method for automatically securing a mail item, with a fixing arrangement designed to secure the mail item to a transport tray on which the mail item can be placed.

In general, a centre for handling, storing, sorting and/or sending mail items used by a logistics, postal, shipping, or transport company and/or airport is understood to be a parcel centre, also referred to as a shipping centre, main distribution centre (HUB), or freight centre and will be referred to hereinafter only as a parcel centre or shipping centre. Within the scope of the invention, mail items are any type of portable goods, for example letters, parcels, freight goods, freight shipments, freight units, packages or the like. A parcel centre is often structured such that mail items firstly can be delivered in a delivery area, for example by lorry or by rail. For simpler handling, a plurality of mail items are in many cases placed on a pallet, for example a Europool pallet, adjacently and/or stacked on top of one another.

By means of a forklift truck or the like, the pallets can be unloaded from the lorry in the delivery area and can be set down within the shipment centre on a transport trolley movable in a manually actuatable manner or by means of a tractor unit. The pallets can be moved by means of the transport trolley to a sorting facility for sorting the mail items, for example on the basis of a target region. Alternatively, the pallets can be stored in an interim storage arrangement often embodied as a high-bay warehouse so as to perform the sorting of the mail items at a subsequent moment in time. On account of the physically increasingly larger shipping centres, sorting facilities or high-bay warehouses are often arranged at a distance of a few hundred meters from the delivery region.

Such a transport of a pallet within the shipping centre generally requires an operator, either for the manually actuatable transport trolley or for the tractor unit. The transport between lorry and sorting facility or interim storage arrangement is thus complex and also costly. In addition, the mail items provided on the pallet are in many cases only insufficiently or not at all secured against slipping and loss. In this regard, it is not unusual for mail items to fall off from the pallet over the transport path, which measures a few hundred meters in length. The mail items that fall off are in many cases damaged and reach their addressees late or not at all, which involves a costly replacement of the mail items or, in the case of leaked liquids, even results in time-consuming and costly fire brigade operations.

SUMMARY

Proceeding from this situation, one object of the invention is to specify an assembly and a method by means of which a mail item, for example in a shipping centre, can be supplied in a particularly reliable manner and preferably in an automated manner, once unloaded, to a further processing, for example in a sorting facility. A further object of the invention is to secure the mail item in an automated manner against damage or against falling off during transport within the shipping centre The objects of the invention are achieved by the features of the independent claims. Advantageous embodiments are specified in the dependant claims.

The objects are therefore achieved by an assembly for the automatic securing of at least one mail item on a pallet, comprising the pallet with mail item arranged thereon, a fixing arrangement designed to secure the mail item to the pallet, and a transport tray, on which the pallet can be placed, wherein the assembly for lowering and raising the transport tray in a height-changing manner is designed in such a way that, by lowering the transport tray into a loading position, the distance between the fixing arrangement and the transport tray is increased in such a way that, in the loading position, the pallet can be placed, with mail item arranged thereon, on the transport tray between said transport tray and the fixing arrangement, and is designed in such a way that, by raising the transport tray from the loading position, the distance between the fixing arrangement and the transport tray is reduced in such a way that the fixing arrangement comes to rest on the mail item in order to secure said mail item against falling off from the pallet placed on the transport tray. In a preferred development the assembly has a pallet with mail item arranged thereon, wherein the fixing arrangement is designed to secure the mail item to the pallet, and the assembly is designed in such a way that, in the loading position, the pallet, with mail item arranged thereon, can be placed on the transport tray between said transport tray and the fixing arrangement.

A key aspect of the invention is thus that the mail item is automatically secured against falling off from the transport tray or the pallet by raising the mail item or the transport tray from the loading position. On the other hand, the securing of the mail item is automatically cancelled again by lowering into the loading position, such that the mail item or the pallet with mail item arranged thereon can be removed from the transport tray. The proposed assembly can be used for example in a shipping, distribution, parcel or freight centre, in a main distribution centre (HUB for short), in an airport and/or in a high-bay warehouse or logistics warehouse. The assembly makes it possible for the mail item to be automatically secured against falling out from the transport tray or the pallet and therefore against damage or loss as it is conveyed in the parcel centre. In principle, the assembly can be used for palletised and non-palletised mail items. Where reference is made hereinafter to mail items arranged on a pallet, the described embodiment is not limited to an obligatory presence of the pallet. The assembly can also be operated without pallet, for example when the mail item is placed directly on the transport tray.

By way of example, the proposed assembly can be used as follows: a lorry delivers a plurality of mail items, collected from a logistics service provider, from automated parcel drop-off and collection stations or parcel mailboxes, and/or mail items picked up directly from customers, to a parcel centre in which the assembly is installed. The mail items are firstly manually unloaded from the lorry by an operator in a delivery area. If the mail items are already provided on a pallet, for example a Europallet, the pallet can be unloaded from the lorry using a forklift, for example. If the mail items are not yet arranged on a pallet, the mail items can be manually unloaded, for example with the aid of a conveyor belt projecting into the lorry, and deposited on a pallet. Mail items, for example from an air freight pallet and/or from an air freight container, also referred to as a unit load device or ULD for short, can also be unloaded in a HUB in order to directly deposit or position the mail items on the transport tray following removal by means of a forklift truck. The pallet loaded with the mail items is placed by means of the forklift truck on the transport tray arranged in the loading position, whereupon the assembly raises the transport tray or the mail items.

As a result of the raising, the fixing arrangement comes to rest on the mail items and in this way secures the mail items against falling off from the pallet. If the transport tray with the pallet arranged thereon is now moved, for example by means of a conveyor belt or the like, within the parcel centre to a sorting facility physically removed from the delivery area, the mail items cannot fall off from the pallet or the transport tray as a result of acceleration forces occurring for example as the pallet or transport tray negotiates corners. The transport tray is lowered at the sorting facility, whereby the securing of the mail item provided by the fixing arrangement is cancelled and the pallet can be removed from the transport tray and supplied to the sorting facility or the like, again using a forklift truck for example. As a result, it is ensured, by means of the proposed assembly, that, when the pallet or the transport tray with mail item arranged thereon is transported, the mail item cannot fall off during the transport, for example over a distance of several hundred meters, and therefore cannot be damaged or lost.

The transport tray, in the loading position, preferably lies with contact on a floor, for example on the floor of the parcel centre. The assembly can also have a base plate, a platform, a pedestal or the like, on which the transport tray comes to rest in the loading position. As the transport tray is raised from the loading position, the fixing arrangement remains preferably initially in its horizontal holding position distanced from the loading position until the mail item contacts the fixing arrangement as a result of the further raising of the transport tray. From this moment or shortly thereafter, the fixing arrangement preferably leaves its former holding position so as to be raised further, during the further raising operation, and/or moved in a horizontal direction in the parcel centre together with the transport tray, whilst remaining in its position relative to the transport tray. As a result of the raising of the transport tray from the loading position, the fixing arrangement preferably comes to rest with contact on the mail item in a fixing position so as to fix the mail item on the pallet or the transport tray in a stable location and/or position. The assembly or the transport tray is preferably embodied such that, when the fixing arrangement bears against the mail item, the fixing position is retained until the transport tray is lowered into the loading position by means of the assembly. Within the scope of the invention, a mail item will be understood to mean in principle any freight item transportable on a pallet, for example parcels, letters, boxes or other transportable articles.

In accordance with a preferred development, the fixing arrangement is arranged on the transport tray preferably at an edge thereof, wherein a telescopic rod and/or a cable are/is provided preferably between the fixing arrangement and the transport tray. In the loading position the telescopic rod is preferably fully extended, whereas the telescopic rod is retracted by the raising of the transport tray. For the case in which there is no mail item or pallet placed on the transport tray, the telescopic rod is preferably fully retracted by raising the transport tray. In accordance with a further preferred embodiment the fixing arrangement extends in the loading position in a plane parallel to and at a distance from the transport tray, in particular in a plane parallel to and at a distance from the planar extent of the transport tray. In yet a further preferred embodiment the fixing arrangement is formed as a cable, as a rubber cable, as a mesh, as a lattice, and/or as a canvas cover. Additionally or alternatively, the fixing arrangement and the transport tray preferably correspond to one another in terms of the size of their base areas, that is to say have a base area of preferably the same or approximately the same size.

The base areas extend, in any case in the loading position, preferably in the horizontal direction. By way of example, the mesh can be formed as a dense polyester mesh, which lies above the mail items by raising the transport tray and in this way secures the mail items from falling off. In the case of a telescopic rod and/or a cable provided between the fixing arrangement and the transport tray, said rod and/or cable can be provided with a spring or a rubber in such a way that, once the transport tray has been raised, the spring force or the rubber force can brace the fixing arrangement in the direction of the transport tray. The spring force or rubber force thus assists the automatic fixing of the mail item to the transport tray. The spring is particularly preferably arranged within the telescopic rod in such a way that the telescopic rod is biased into the retracted position and in this way continuously secures the mail item in the fixing position.

In accordance with a particularly preferred embodiment the transport tray and the fixing arrangement each have a rectangular base area, said base areas corresponding to one another, wherein a telescopic rod is provided at each corner and extends at right angles to the base areas, in particular in the loading position, and extends between the transport tray and the fixing arrangement. In accordance with a further preferred embodiment a cable is provided between the fixing arrangement and the transport tray and is diverted on the transport tray toward the underside of the transport tray and is connected to a spring means and/or rubber cable arranged on the underside in order to contract the cable as the transport tray is raised. In the case of the cable it is also advantageous when the transport tray and the fixing arrangement each have a rectangular base area, said base areas corresponding to one another, a cable being provided at each corner. The aforementioned embodiments have proven to be both particularly easily producible and also particularly reliable in day-to-day operation, so as to automatically secure the mail item by raising the transport tray from the loading position.

In accordance with yet a further preferred embodiment, provision is made for the assembly to be embodied such that, when there is no mail item and/or no pallet placed on the transport tray, the fixing arrangement comes to rest on the transport tray, in particular with contact, by raising the transport tray from the loading position. In this way, and unloaded transport tray can be stored in a particularly space-saving manner, for example by being stacked on another transport tray.

There are various possibilities in principle for designing the transport tray. The transport tray is particularly advantageously formed as a trough, as a rest, as a transport container, as a storage box, as a transport platform, as a shallow dish, or as a plate having a partially peripheral edge, wherein two recesses for fork arms are provided at the edge. Due to the peripheral edge, the pallet is prevented from falling out from the transport tray. Due to the two recesses for fork arms, a particularly simple loading of the transport tray by means of a forklift truck is possible. By way of example, the pallet can be introduced by a forklift truck, over the edge, into the gap between transport tray and fixing device and can be set down on the transport tray on account of the recesses for the fork arms. Once the fork arms are removed from the pallet, the transport tray can be raised by the assembly.

There are also various possibilities for the design of the pallet as loading aid. The pallet is particularly preferably designed as a Europool pallet, as an industrial pallet, as a large pallet or as a lattice box and/or the transport tray has an internal dimension corresponding to or protruding beyond the base area of the pallet. The internal dimension of the transport tray is, for example, 1 m×2 m and thus protrudes beyond a base area for example of 0.8 m×1.2 m of a pallet. In the loading position the distance between the fixing arrangement and the transport tray can be arbitrary in principle. However, in view of mail items transported often, it has proven to be particularly advantageous if the distance in the loading position is 0.8 m, 1 m or 1.5 m. If, with a distance of 1.5 m, a pallet with mail items arranged thereon is set down on the transport tray, which inclusive of the mail items has a height of 1.2 m, the distance between the mail items and the fixing arrangement then decreases as the transport tray is raised, from 0.3 m initially in the holding position to 0 m in the fixing position.

In a particularly preferred development a support is provided, which, when the transport tray is in the loading position, is arranged vertically distanced from the transport tray in such a way that, as the transport tray is lowered in the direction of the loading position, the fixing arrangement firstly comes to rest on the support in such a way that, with the further lowering, the fixing arrangement remains in the vertically distanced position predefined by the support, that is to say the holding position. A projection, a protrusion, or the like is preferably provided on the fixing arrangement in a manner corresponding to the support and comes to rest on the support, in particular in an interlocking manner, during the lowering process.

If the distance between the fixing arrangement and transport tray in the loading position is 1 m, for example, the support can also be arranged at a distance of 1 m from the transport tray in the loading position. With a rectangular design of the transport tray corresponding to each corner of the transport tray, a support is particularly preferably provided on the assembly, and four projections are provided, with corresponding design, on the fixing arrangement. The design with a support of this type has proven to be particularly advantageous, since, as the transport tray is lowered, the fixing arrangement is thus initially prevented in the holding position from being lowered further, whereas the transport tray can be lowered further as far as the loading position, increasing the distance between the fixing arrangement and transport tray.

In accordance with yet a further preferred embodiment, the fixing arrangement has a peripheral frame, which, during the lowering process, preferably comes to rest on the support in the holding position. By way of example, the peripheral frame can be formed from a metal profile, to which the mesh for covering and thus securing the mail items is secured. With regard to the aforementioned projections, these can be formed advantageously integrally with the frame.

As described at the outset, the transport tray is loaded with the mail item or the pallet for example using a forklift truck that can be actuated by an operator, or purely manually. So that the operator, once the fork arms have been removed from the pallet or the transport tray, does not have to manually prompt the raising of the transport tray, for example by actuation of a switch, provision is made in accordance with a further embodiment for the transport tray to be automatically raised once the mail item and/or the pallet have/has been placed on the transport tray. The automatic raising, however, preferably occurs only when the fork arms have been fully removed from the pallet or the transport tray. By way of example, a light barrier, a weight sensor, or the like can be provided, which detects the loading of the transport tray with the pallet and then triggers the raising of the transport tray, optionally with a time delay. A remote control can also be provided to provide release for the raising, which remote control is carried for example by an operator. The remote control is preferably connected in terms of communication to the installation and can be designed as an application for a smartphone.

In accordance with yet a further preferred embodiment the assembly is designed as a lift, lifting platform and/or conveyor track. By way of example, it is conceivable that, following the raising initially in a vertical direction, the transport tray with the pallet and mail item secured thereon moves for example on the conveyor track or a conveyor belt within the parcel centre in a horizontal direction as far as a sorting area physically distanced from the delivery area. The transport tray can be lowered at the sorting area for unloading and further processing of mail items. In this regard, the assembly is not only limited to a single lift, but can be understood as a combination of a number of assemblies each having arrangements for raising and lowering the transport trays and horizontally displacing said transport trays between the lifts.

The object is additionally solved by a method for automatically securing a mail item arranged on a pallet, with a fixing arrangement designed to secure the mail item to the pallet and with a transport tray, on which the pallet can be placed, said method having the following steps: lowering the transport tray into a loading position, whereby the distance between the fixing arrangement and the transport tray is increased in such a way that, in the loading position, the pallet, with mail item arranged thereon, can be placed on the transport tray between said transport tray and the fixing arrangement, placing the pallet with the mail item on the transport tray, and raising the transport tray from the loading position, whereby the distance between the fixing arrangement and the transport tray is reduced in such a way that the fixing arrangement comes to rest on the mail item in order to secure the mail item against falling off from the pallet placed on the transport tray.

Due to the proposed method, it is ensured that, by raising the transport tray from the loading position, the mail item is automatically secured against falling off from the pallet, such that the mail item, as it is transported on further, for example in a horizontal direction within a parcel centre, is not damaged and/or is secured against loss. The pallet is preferably placed on the transport tray by means of a forklift truck or the like, wherein a manually actuatable pallet truck can also be used.

Further embodiments and advantages of the method will become clear to a person skilled in the art by analogy with the previously described assembly.

The invention will be further explained in detail hereinafter with reference to the accompanying drawings.

DETAILED DESCRIPTION OF THE DRAWINGS

Figure 1:
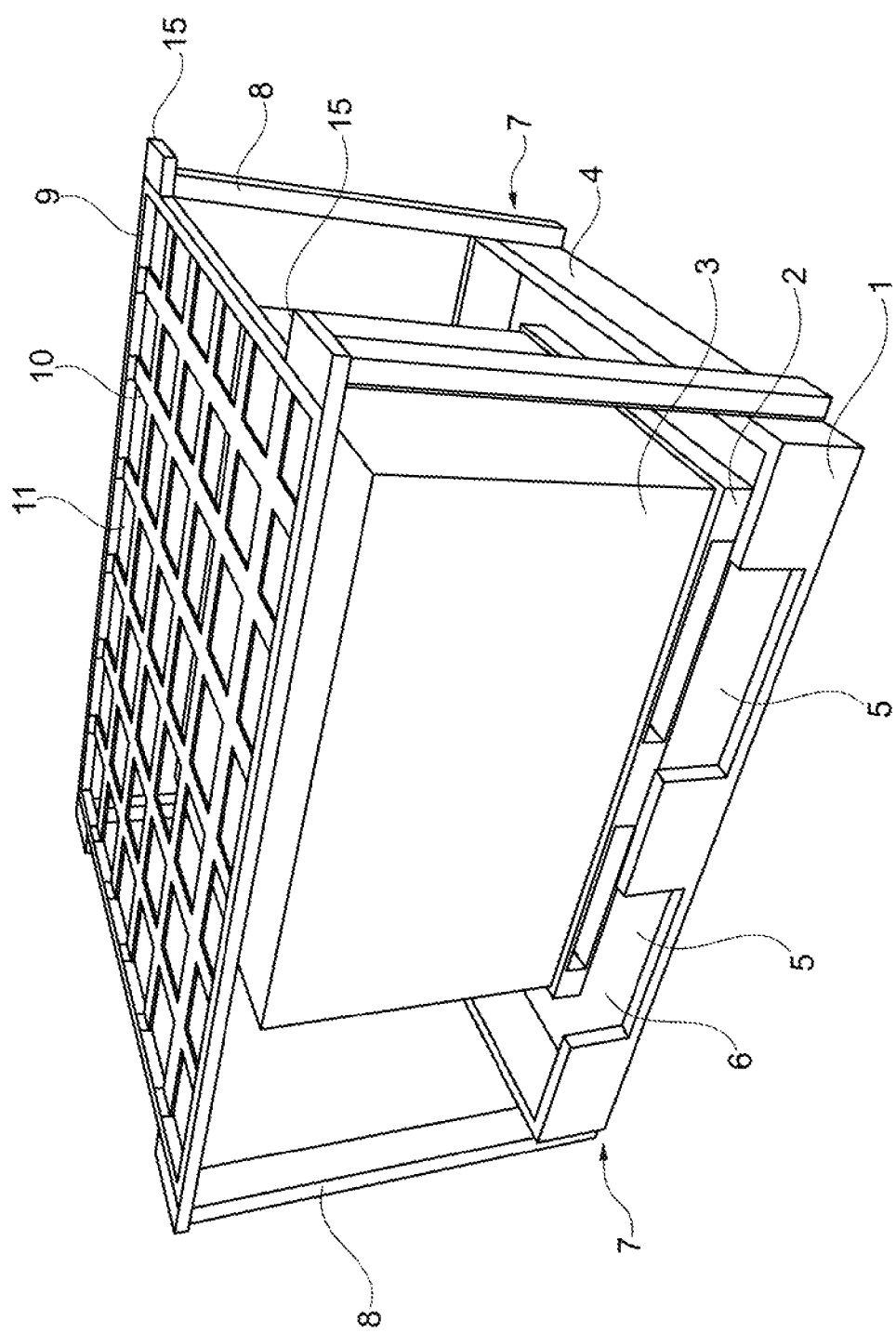
FIG. 1 shows a transport tray with a pallet and mail item arranged thereon in accordance with a preferred exemplary embodiment of the invention in a schematic perspective view.

FIG. 1 shows a transport tray 1 with pallet 2 placed thereon in accordance with a preferred exemplary embodiment of the invention in a schematic perspective view. The pallet 2 is embodied as a Europool pallet, also referred to as a Europallet, in accordance with standard EN13698-1 and has a base area of 0.96 m$^2$ and dimensions of 1.2 m×0.8 m in length and width with a height of 14.4 cm. A mail item 3 is placed on the pallet 2, the base area of the mail item being a few centimeters smaller than the base area of the pallet 2. Although only a single mail item 3 is shown in FIG. 1, it is also possible and generally also the case that a multiplicity of different mail items 3, possibly also having different dimensions, are placed on the pallet 2. Although not shown, the mail item 3 can be placed directly on the transport tray 1, which is also included by the following description.

The pallet 2 with the mail item 3 arranged thereon was unloaded in a previous step from a lorry at a parcel centre by means of a forklift truck and was placed in a second step by the forklift truck on the transport tray 1 in the position shown in FIG. 1. The transport tray 1 is embodied in the manner of a trough having a peripheral edge 4 made of metal. Two recesses 5 for fork arms of the forklift truck are provided on a front side of the transport tray 1 in the edge 4. The forklift truck can thus introduce the pallet 2 over the edge 4 in a horizontal direction above the transport tray 1, place the pallet 2 on the transport tray 1, and then remove the fork arms through the recesses 5. The transport tray 1 has a four-cornered base area 6 with an internal dimension of 1.2 m×1.4 m, wherein the edge 4 extends along the base area 6 and upwardly away from the base area 6 at right angles by 15 cm.

Metal telescopic rods 8 extending upwardly away from the base area 6 at right angles are provided at each of the corners 7 of the base area 6. The telescopic rods 8 are shown in FIG. 1 in their fully extended position. A spring is provided inside each of the telescopic rods 8 and biases the telescopic rod 8 into its retracted position. Whereas the telescopic rods 8 are connected at their lower end to the transport tray 1, the upper ends are connected to a rectangular frame 9 formed from a metal profile. A fixing arrangement 10 embodied as a mesh is secured to the frame 9 at periodic distances and is surrounded peripherally by the frame 9.

Figure 2:
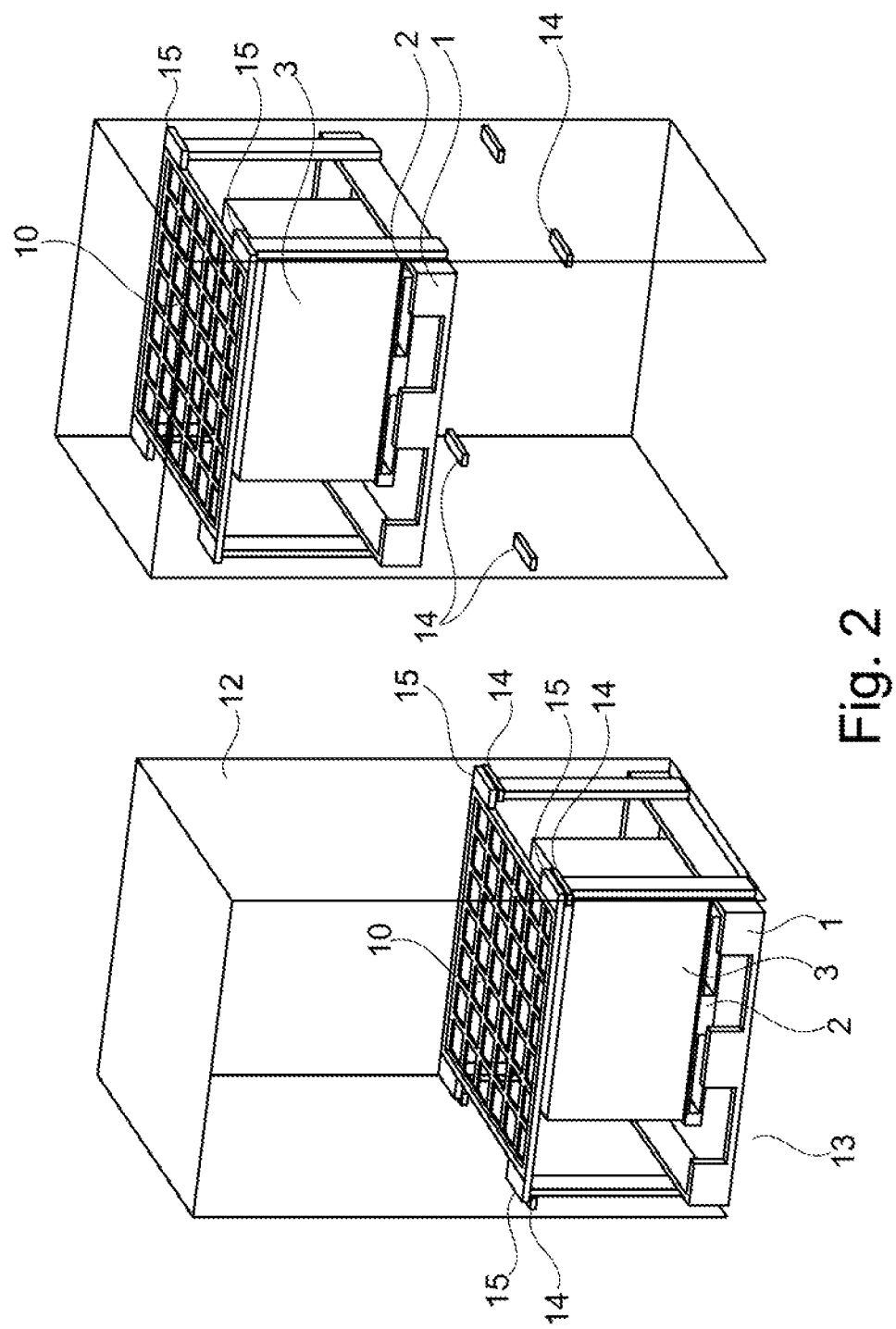
FIG. 2 shows, on the left-hand side, an assembly with the transport tray according to FIG. 1 in a loading position and, on the right-hand side, the assembly with the transport tray according to FIG. 1 once the transport tray has been raised from the loading position, in each case in accordance with the preferred exemplary embodiment of the invention in a schematic perspective view.

FIG. 2 shows the transport tray 1 already presented in FIG. 1 with pallet 2 arranged thereon and mail item 3 in an assembly 12 embodied as a lift. The transport tray 1 with pallet 2 and mail item 3 arranged thereon, in a height-adjustable manner, can be lowered into a loading position on a floor 13 of the parcel centre, said position being shown on the left-hand side in FIG. 2, and can be raised from the loading position, as is shown on the right-hand side in FIG. 2, by means of the lift. In the loading position, the fixing arrangement 10, as also shown in FIG. 1, is arranged at a distance from the transport tray 1 in a holding position.

On a lateral, horizontal profile of the assembly 12, two supports 14 are arranged opposite one another, in which, as shown on the left-hand side in FIG. 2, protrusions 15 provided correspondingly on the frame 9 engage in an interlocking manner in a holding position of the fixing arrangement 10. As the transport tray 1 is lowered from the position shown on the right-hand side in FIG. 2 into the loading position shown on the left-hand side in FIG. 2, the fixing arrangement 10 remains at the height of the support 14 in the holding position, whereas the transport tray 1 can be lowered further into the loading position until on the floor 13.

If, however, the transport tray 1 is raised from the loading position to the position shown in the right-hand side in FIG. 2, the distance between the fixing arrangement 10 and the mail item 3 initially reduces, since the telescopic rods 8 shorten. Only when, as shown on the right-hand side in FIG. 2, the fixing arrangement 10 comes to rest with contact on the mail item 3, do the telescopic rods 8 no longer shorten any further, and the fixing arrangement 10 remains in a fixing position distanced from the transport tray 1.

The mail item 3 is thus secured from falling off from the pallet 2, on the one hand whilst the transport tray 1 is being raised in a vertical direction and on the other hand when the transport tray 1 is moved in a horizontal direction, for example within the parcel centre, to a sorting facility or the like. Once the transport tray 1 with the mail item 3 has arrived at the sorting facility, the transport tray 1 can be lowered, in a further assembly 12, to unload the pallet 2.

Figure 3:
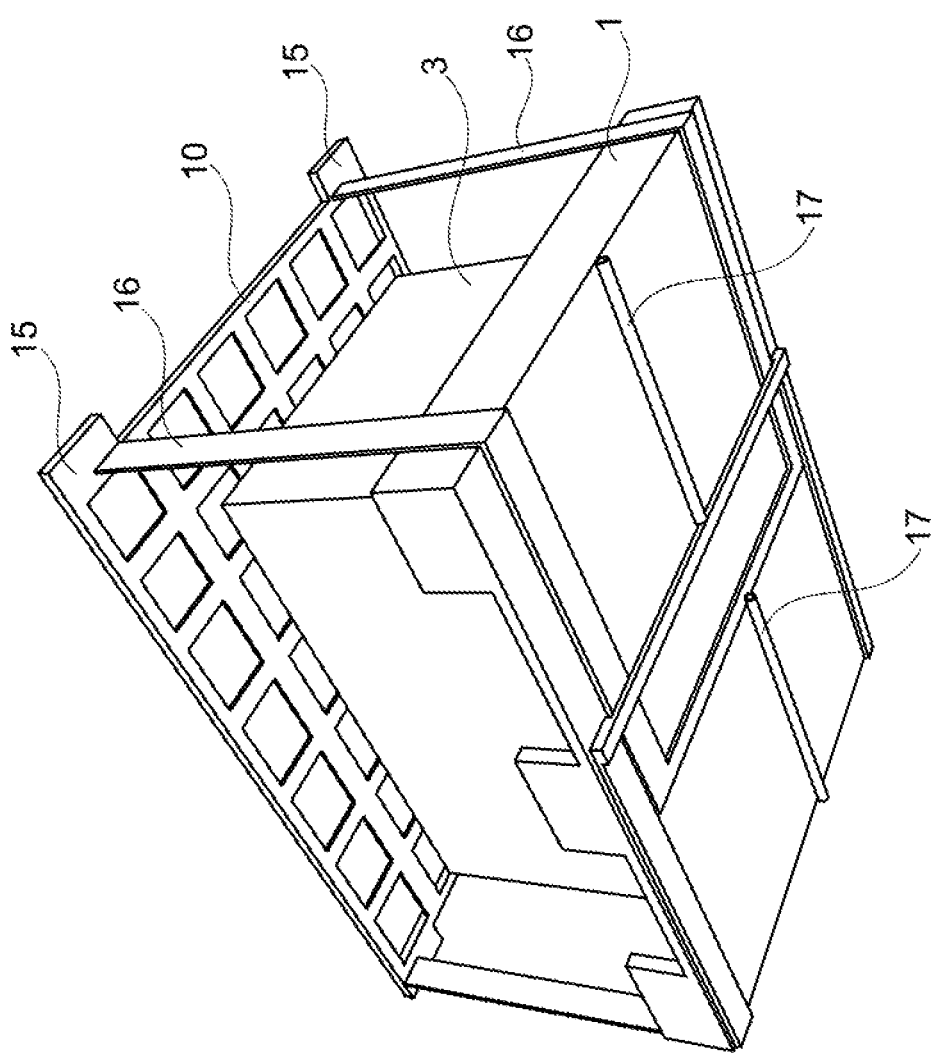
FIG. 3 shows the transport tray in accordance with a further preferred embodiment in a schematic perspective view from below.

FIG. 3 shows a design of the transport tray 1 in accordance with a further preferred exemplary embodiment in a schematic perspective view from below. Instead of the telescopic rods 8 which are self-contracting on account of the spring, cables 16 are provided at the corners 7 of the fixing arrangement 10 or of the frame 9. A cable 16 is connected to each corner 7 of the frame 16 and extends in the direction of the transport tray 1. The cables 16 are deflected at the transport tray 1 toward the underside of the transport tray 1 and are each connected to a spring means 17 arranged on the underside so as to contract the cable 16 as the transport tray 1 is raised.

FIG. 3 firstly shows the non-contracted state of the spring means 17. With raising, the distance between the transport tray 1 and fixing arrangement 10 reduces, such that the spring means 17 contracts. In the fixing position the fixing arrangement embodied as a mesh bears against the mail item 3. The spring means 17 prevents the mesh from releasing from the mail item 3 as the raising is continued and thus secures the mail item 3 from falling off or slipping.

Figure 4:
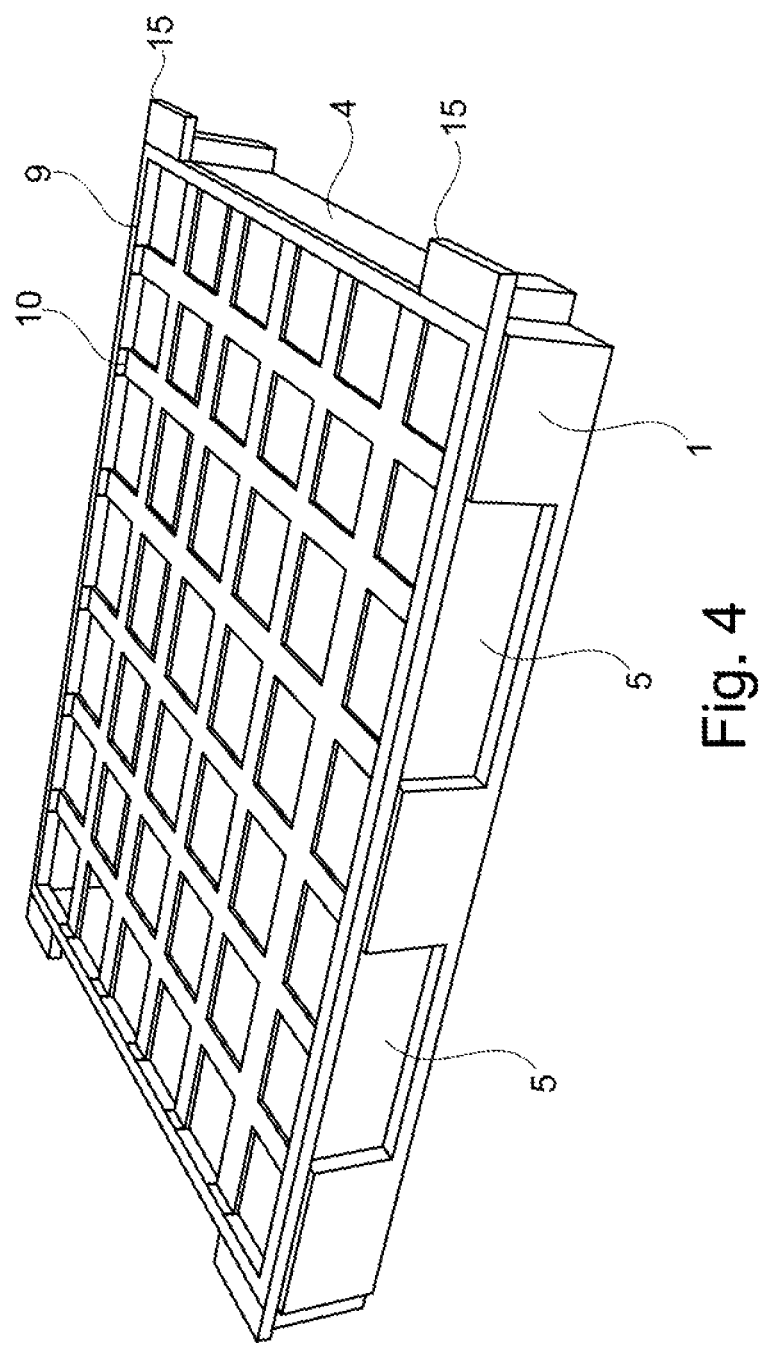
FIG. 4 shows the transport tray according to FIG. 1 with fixing arrangement arranged thereon in accordance with the preferred exemplary embodiment of the invention in a schematic perspective view.

FIG. 4 lastly shows a transport tray 1 without a pallet 2 arranged thereon and without a mail item 3. The telescopic rods 8 are drawn together fully so that the fixing arrangement 10 bears with contact against the edge 4 of the transport tray 1. The transport tray 1 thus can be stored in a particularly space-saving manner, wherein a plurality of transport trays 1 can be stored one above the other.

LIST OF REFERENCE SIGNS transport tray 1
pallet 2
mail item 3
edge 4 recess 5
base area 6
corner 7
telescopic rod 8
frame 9
fixing arrangement 10
base area 11
assembly 12
floor 13
support 14
protrusion 15
cable 16
spring means 17

The invention claimed is:

1. A system comprising a lift assembly and a tray assembly for securing a mail item, the tray assembly comprising a transport tray, a peripheral frame, a mesh coupled to the peripheral frame and a telescopic rod coupling the transport tray and the peripheral frame, wherein telescoping the telescopic rod varies a distance between the transport tray and the peripheral frame, wherein the lift assembly comprises a support adapted to engage the peripheral frame when the tray assembly is moved vertically relative to the support while the support is adapted to not engage the transport tray permitting the transport tray to move vertically past the support, wherein the support is vertically spaced apart from a loading position of the transport tray, wherein, when lowering the transport tray into the loading position from above the loading position, the peripheral frame comes to rest on the support before the loading position is reached and, as the transport tray continues to be lowered further to the loading position, the distance between the peripheral frame and the transport tray increases thereby extending the telescopic rod, wherein, when the transport tray is in the loading position, the peripheral frame remains in a vertically distanced position predefined by the support that permits placing the mail item on the transport tray between the transport tray and the mesh, and wherein raising the transport tray away from the loading position contracts the telescopic rod thereby reducing the distance between the mesh and the transport tray until the mesh rests on the mail item thereby securing the mail item against falling off from the transport tray.

2. The system according to claim 1, further comprising a pallet with mail item arranged thereon, wherein, when the transport tray is in the loading position, the pallet with mail item arranged thereon can be placed on the transport tray between said transport tray and the mesh.

3. The system according to claim 2, wherein the pallet is selected from the group consisting of a Europool pallet, an industrial pallet, a large pallet, and a lattice box.

4. The system according to claim 1, wherein, when the transport tray is in the loading position, the mesh extends in a plane parallel to and at a distance from the transport tray.

5. The system according to claim 1, wherein the mesh and the transport tray correspond to one another in terms of the size of their base areas.

6. The system according to claim 1, wherein the transport tray and the mesh each have a rectangular base area, said base areas corresponding to one another, and the telescopic rod is provided at each corner and extends in each case at right angles to the base areas and between the transport tray and the peripheral frame.

7. The system according to claim 1, wherein a form of the transport tray is selected from the group consisting of a trough, a support box, a shallow dish, and a plate having a partially peripheral edge, and wherein the transport tray includes two recesses for fork arms are provided at the edge.

8. The system according to claim 1, wherein the distance between the mesh and the transport tray in the loading position is 0.8 m.

9. The system according to claim 1, wherein the distance between the mesh and the transport tray in the loading position is 1 m.

10. The system according to claim 1, wherein the distance between the mesh and the transport tray in the loading position is 1.5 m.

11. The system of claim 1, wherein the tray assembly further comprises a protrusion that extends laterally away from the peripheral frame, wherein the support engages the protrusion.

12. The system of claim 1, wherein the lift assembly comprises a plurality of supports that engage the peripheral frame, wherein two supports are spaced apart from each other a distance greater than a width of the transport tray.

13. The system of claim 12, wherein the tray assembly further comprises a plurality of protrusions that extends laterally away from the peripheral frame, wherein each of the plurality of supports engage an individual protrusion.

14. The system of claim 13, wherein a size of a base area of the transport tray corresponds to a size of a base area of the peripheral frame.

15. The system of claim 1, wherein the lift assembly further comprises a wall that spaces the support apart from the loading position.

16. A method for automatically securing a mail item on a tray assembly using a lift assembly, the tray assembly comprising a transport tray, a mesh with a peripheral frame, and a telescopic rod coupling the transport tray and the peripheral frame, wherein telescoping the telescopic rod varies a distance between the transport tray and the peripheral frame, wherein the lift assembly comprises a support that engages the peripheral frame when the tray assembly is moved vertically relative to the support while the support is adapted to not engage the transport tray permitting the transport tray to move vertically past the support, wherein the support is vertically spaced apart from a loading position of the transport tray, the method comprising the following steps:

lowering the transport tray until the peripheral frame rests on the support, after the peripheral frame rests on the support, continuing lowering the transport tray to the loading position thereby extending the telescopic rod and increasing the distance between the mesh and the transport tray as the peripheral frame remains resting on the support in a vertically distanced position predefined by the support, placing the mail item on the transport tray, and raising the transport tray away from the loading position, thereby contracting the telescopic rod and reducing the distance between the mesh and the transport tray until the mesh rests on the mail item thereby securing the mail item against falling off the transport tray.

* * * * *